United States Patent
Irii et al.

(10) Patent No.: US 9,746,156 B2
(45) Date of Patent: Aug. 29, 2017

(54) ILLUMINATION SYSTEM

(71) Applicants: Yoshinao Irii, Osaka (JP); Yoshihide Nishikawa, Osaka (JP)

(72) Inventors: Yoshinao Irii, Osaka (JP); Yoshihide Nishikawa, Osaka (JP)

( * ) Notice: Subject to any disclaimer, the term of this patent is extended or adjusted under 35 U.S.C. 154(b) by 0 days.

(21) Appl. No.: 14/377,118

(22) PCT Filed: Feb. 5, 2013

(86) PCT No.: PCT/JP2013/052610
§ 371 (c)(1),
(2) Date: Aug. 6, 2014

(87) PCT Pub. No.: WO2013/118721
PCT Pub. Date: Aug. 15, 2013

(65) Prior Publication Data
US 2015/0055328 A1    Feb. 26, 2015

(30) Foreign Application Priority Data

Feb. 6, 2012   (JP) ................................ 2012-023179

(51) Int. Cl.
*F21V 7/05*     (2006.01)
*F21V 33/00*    (2006.01)
(Continued)

(52) U.S. Cl.
CPC ................ *F21V 7/05* (2013.01); *A47F 11/10* (2013.01); *B44F 1/02* (2013.01); *E04B 9/32* (2013.01);
(Continued)

(58) Field of Classification Search
CPC ............. F21Y 2101/02; F21Y 2103/00; F21Y 2105/001; F21Y 2103/003; F21Y 2105/10;
(Continued)

(56) References Cited

U.S. PATENT DOCUMENTS

| 2,875,543 A | 3/1959 | Sylvester et al. |
| 4,233,767 A | 11/1980 | Hryhorczuk |

(Continued)

FOREIGN PATENT DOCUMENTS

| DE | 4344772 | 8/1995 |
| GB | 438884 | 11/1935 |

(Continued)

OTHER PUBLICATIONS

Extended European Search Report, Jul. 7, 2015; European Patent Application No. 13746684.3 (6 pages).
(Continued)

*Primary Examiner* — Hargobind S Sawhney
(74) *Attorney, Agent, or Firm* — Hamre, Schumann, Mueller & Larson, P.C.

(57) ABSTRACT

[Problem] To provide an illumination system with which a visual effect is provided such that it is possible to give an appearance of expanding depth on the far side of a wall face, even if a person stands directly in front thereof.
[Solution] An illumination system (100) comprises a light source (130), and a reflection board (120) that provides a reflection face that reflects illumination light from the light source (130). The reflection lace of the reflection board (120) is a processed reflection face in which are disposed a plurality of grooves which are very narrow parallel straight lines or parallel curved lines with respect to a flat plane. A support body (110) supports the light source (130) facing and in close proximity to the processed reflection board of the reflection board (120). Light points appear, arranged perpendicularly in the center of the reflection board (120) facing the light source. The formation locations of virtual images of each of the light points are formed further in the depth direction from the processed reflection board the further apart they are vertically, and thus a viewer has the (Continued)

sense of viewing a light beam track which is formed when a horizontal plane, which seemingly expands horizontally in the depth of the wall face, is illuminated, and has the sense of viewing an expanding space in the depth direction of the wall face.

16 Claims, 17 Drawing Sheets

(51) Int. Cl.

| | | |
|---|---|---|
| F21S 8/00 | (2006.01) | |
| F21V 7/00 | (2006.01) | |
| F21S 10/02 | (2006.01) | |
| E04B 9/32 | (2006.01) | |
| A47F 11/10 | (2006.01) | |
| F21S 8/04 | (2006.01) | |
| B44F 1/02 | (2006.01) | |
| G02B 19/00 | (2006.01) | |
| G02B 27/22 | (2006.01) | |
| A47F 3/00 | (2006.01) | |
| F21W 121/00 | (2006.01) | |
| F21W 131/405 | (2006.01) | |
| F21W 131/301 | (2006.01) | |
| F21Y 115/10 | (2016.01) | |

(52) U.S. Cl.
CPC . *F21S 8/00* (2013.01); *F21S 8/04* (2013.01); *F21S 10/023* (2013.01); *F21V 7/0008* (2013.01); *F21V 33/0012* (2013.01); *G02B 19/0019* (2013.01); *G02B 19/0061* (2013.01); *G02B 19/0066* (2013.01); *G02B 27/2221* (2013.01); *A47B 2220/0077* (2013.01); *A47F 3/001* (2013.01); *F21W 2121/00* (2013.01); *F21W 2131/301* (2013.01); *F21W 2131/405* (2013.01); *F21Y 2115/10* (2016.08)

(58) Field of Classification Search
CPC . F21Y 2115/10; F21S 8/04; F21S 8/00; F21S 8/026; F21S 48/215; F21S 10/023; F21V 7/00; F21V 7/005; F21V 7/05; F21V 7/0016; F21V 7/0083; F21V 7/0008; F21V 7/0025; F21V 7/041; B44F 1/02; F21W 2121/00; G02B 19/0019; G02B 19/0061; G02B 19/0066; G02B 27/2235; G02B 27/24; G02B 5/124; G02B 27/2221; G02B 5/021; G02B 27/0977; G02B 5/0284; G02B 5/2931; G02B 6/0019; G02B 6/0031; G02B 6/0055; G02B 6/0061; G02B 6/0068; A47B 2220/0077; G02F 1/133621; G09F 13/14; G09F 13/16; A47F 11/10; F21L 4/027

See application file for complete search history.

(56) References Cited

U.S. PATENT DOCUMENTS

| | | | | |
|---|---|---|---|---|
| 4,704,662 | A * | 11/1987 | Makino | B66B 11/0233 362/147 |
| 5,542,201 | A * | 8/1996 | Grondal | G02B 6/0055 362/800 |
| 6,814,480 | B2 * | 11/2004 | Amano | B60Q 1/2696 362/245 |
| 7,660,039 | B2 * | 2/2010 | Santoro | F21S 11/00 359/15 |
| 7,837,361 | B2 * | 11/2010 | Santoro | F21S 11/00 359/599 |
| 2004/0200164 | A1 | 10/2004 | Schrunk | |
| 2007/0291320 | A1 | 12/2007 | Chen | |
| 2010/0172152 | A1 * | 7/2010 | Boonekamp | F21V 7/0008 362/609 |
| 2011/0090681 | A1 * | 4/2011 | Hobson et al. | F21V 7/00 362/217.05 |
| 2012/0026743 | A1 * | 2/2012 | Yasuoka | F21S 8/04 362/368 |

FOREIGN PATENT DOCUMENTS

| | | |
|---|---|---|
| JP | 11697/1987 | 1/1987 |
| JP | 3-296001 | 12/1991 |
| JP | 57283/1993 | 7/1993 |
| JP | 2001-138700 | 5/2001 |
| JP | 2001-270300 | 10/2001 |
| JP | 2002-192900 | 7/2002 |
| JP | 2003-275080 | 9/2003 |
| JP | 2003-281908 | 10/2003 |
| JP | 2004-233730 | 8/2004 |
| JP | 2006-346238 | 12/2006 |

OTHER PUBLICATIONS

International Preliminary Report, Oct. 9, 2014; PCT/JP2013052610 (4 pages).

* cited by examiner

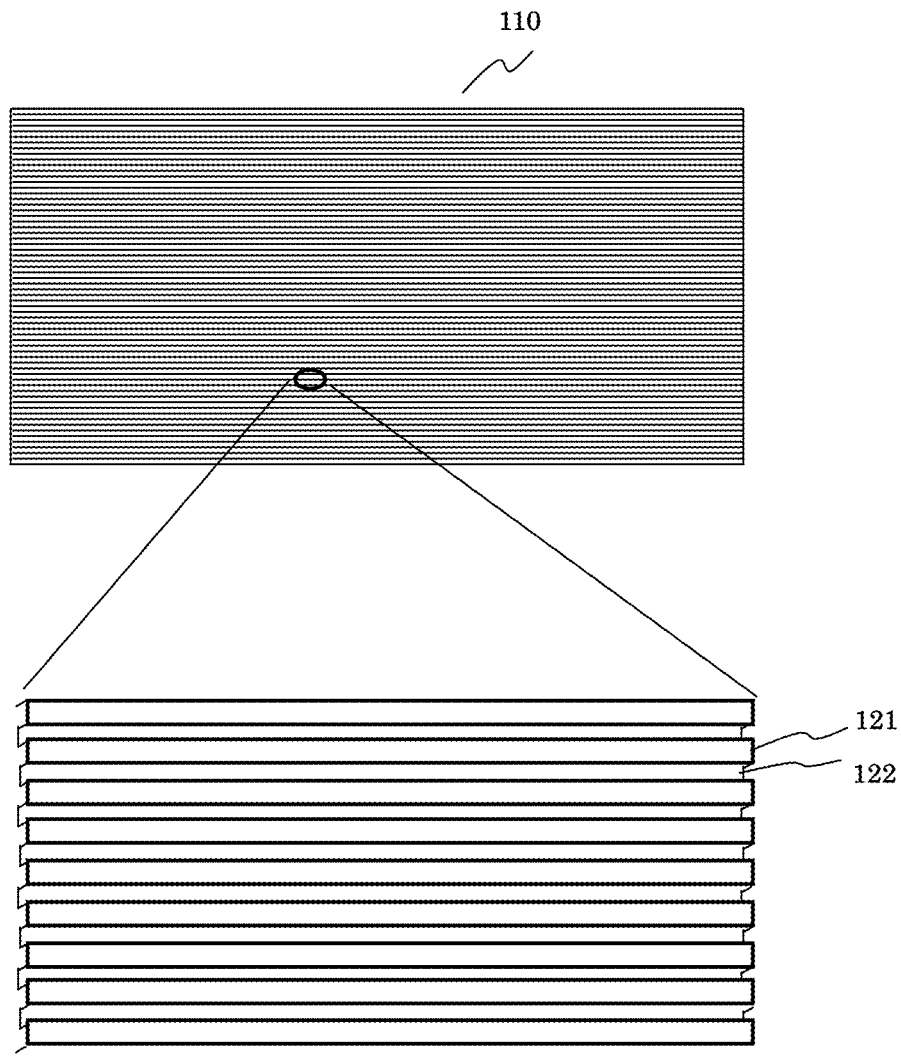

Mirror has large reflection ratio. The reflection angle is decided corresponding to the incidence angle.
A watcher can watch a virtual image of LED light.

A processed reflection plane has relatively low reflection ratio lower than that of mirror. A watcher can watch a series of positional light spots in vertical.

The surface just roughened has a small reflection ratio. A watcher can watch blurred light spot.

Fig.1

[A schematic view showing how observed the reflection light vertically by mirror]

(a)
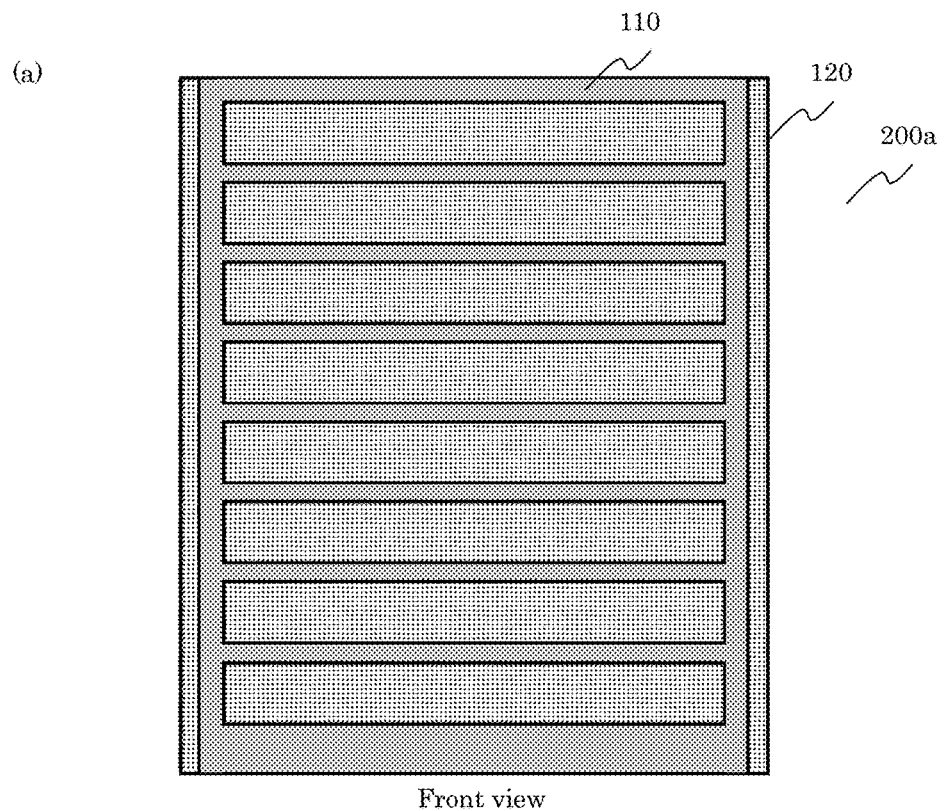
Front view
(b)
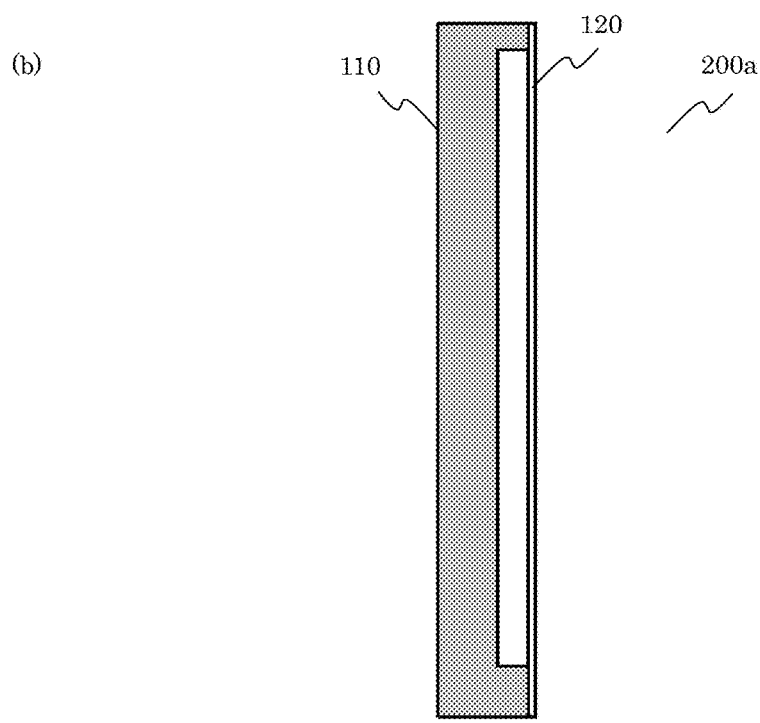
Right side view    Fig.7

[A schematic view showing how observed the light tracks by the processed reflection plane of the present invention]

[A schematic view showing how observed the light tracks by the processed reflection plane of the trial test piece]
(a) Front view
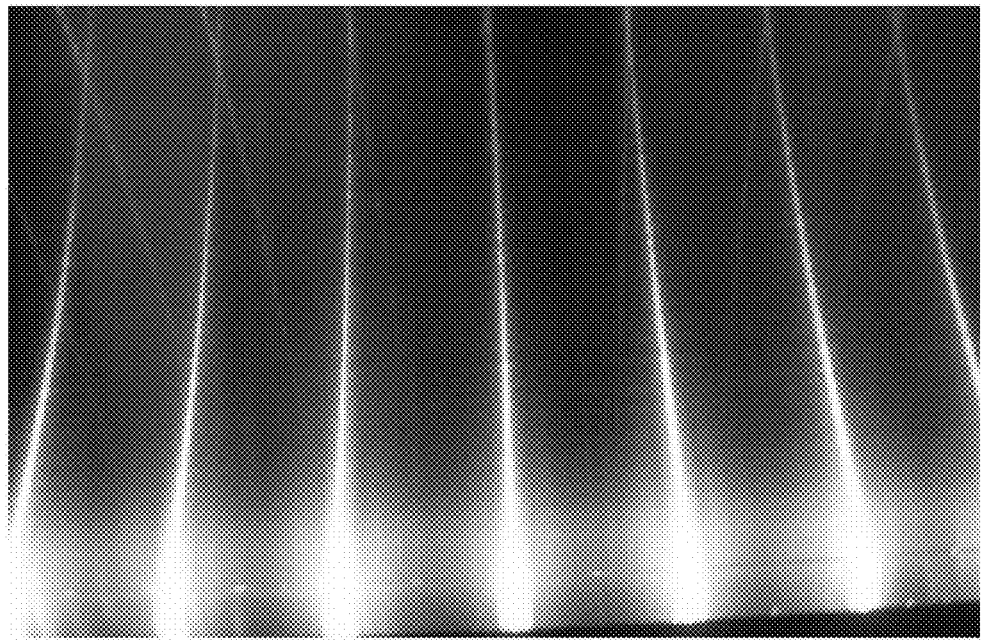
(b) Skewed view
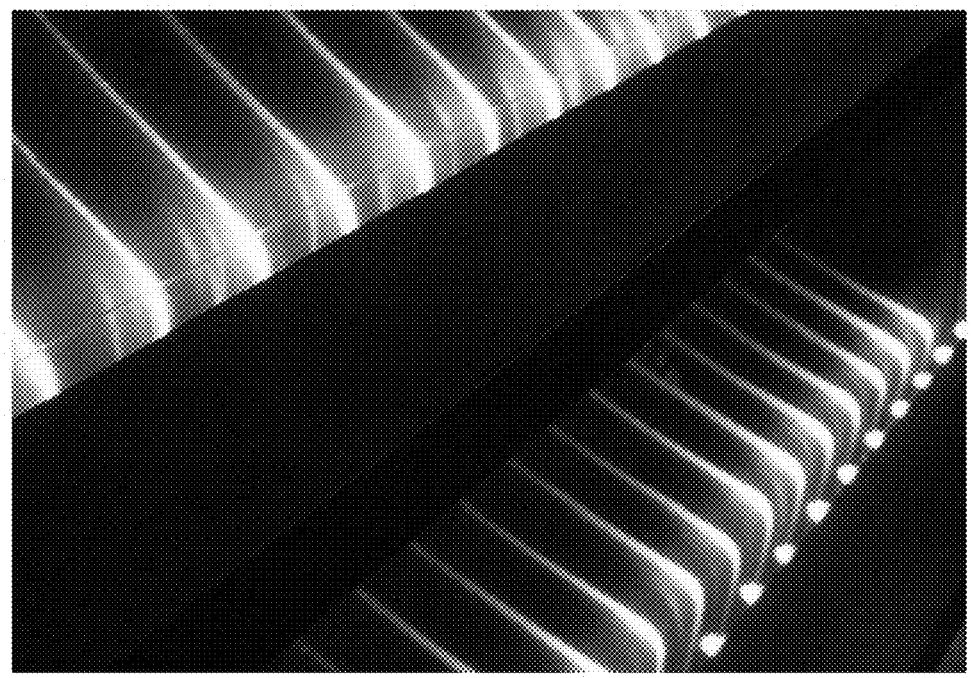
Fig.10

[A schematic view showing how observed the light tracks by the processed reflection plane of the trial test piece]

Several objects are put in front of the processed reflection plane

[A schematic view showing a bar counter 200c employing the illumination system 100 of the present invention]

[A schematic view showing a building decoration roof 200e employing the illumination system 100 of the present invention]

[A schematic view showing a signboard 200f employing the illumination system 100 of the present invention]

ILLUMINATION SYSTEM

TECHNICAL FIELD

This invention relates to an illumination system and various objects such as a building display object on a wall or roof, an interior object, a merchandise display object, furniture and a sales promotion board, that employ the illumination system of the present invention.

Especially, the present invention relates to an illumination system that can provide a visual effect such that is possible to show a light beam track of irradiation light and beautiful reflection light. In addition, the present invention relates to a display object employing the illumination system of the present invention which can highlight the displayed merchandize by the visual effect of the light beam track of irradiation light and reflection light provided by the illumination system of the present invention.

BACKGROUND ART

Various types of illumination system are developed. The illumination system of the present invention is not limited to the one as a merchandize display fixture, but as an example object, the conventional illumination system as applied as a merchandize display fixture is described below.

For example, the illumination system shown in JP2006-346238 (prior art 1) comprises a longitudinal illumination such as a fluorescent lamp installed in front of a shelf board of a merchandize display fixture, and a sectionally U-shaped translucent illumination cover installed to cover the front of the longitudinal illumination and the shelf board of a merchandize display fixture. Illumination light goes from the shelf board to the front direction, upper direction and lower direction by arraying the translucent illumination cover ahead of the front edge of the shelf board.

For example, the illumination system shown in JP2003-275080 (prior art 2) comprises an illumination installed to the lower surface front position of the shelf board of a merchandize display fixture, a slit installed to the shelf board portion where the illumination is arrayed, and a light deflector (a wide prism) on the upper opening of the slit for deflecting the light from the illumination to the upper direction via the slit to the rear direction.

For example, the illumination system shown in JP2003-281908 (prior art 3) comprises a LED, a first lens installed to the light emitting portion of the LED for converging and emitting light, and a second lens installed to the portion to receive the converged light from the first lens for re-converging the converged light to parallel and emitting. The illumination employing the LED can illuminate for a long time by using the small size LED whose heat amount is small and emit the parallel light by the lens. It is a preferable light for a reading light in the train.

PRIOR ART

Prior art 1: JP2006-346238
Prior art 2: JP2003-275080
Prior art 3: JP2003-281908

DISCLOSURE OF THE INVENTION

The Problems to be Solved

Display for promotion applying the artificial illumination effect is increasing in importance in various spaces such as a store, an office and a private room in the house.

The above mentioned conventional illumination system provides the illumination effect for emphasizing the merchandize arrayed in the merchandize display shelf. The illumination effect focuses on highlighting the merchandize for brightening and shining the merchandize itself.

However, the required illumination system for the store, the office and the private room in the house is not only the illumination system applying the illumination effect for highlighting the merchandize for brightening and shining the merchandize itself, but also the illumination system applying the illumination effect for arousing aesthetic pleasure by the illumination and obtaining the visually decorated emotional effect at the surroundings of the merchandize. In other word, not only the illumination effect by the direct illumination focusing on the merchandize, but also the illumination effect by the indirect illumination around of the merchandize is becoming important, which gives people a sense of calm.

The space around the wall in the store, the office and the private room in the house is important. If the space around the wall is utilized effectively, the value of the room space increases. Especially, the wall partitions space and could be considered as a physical obstruction, so it is important for wall to enhance space around the wall for giving the customer the feeling of an extended space spread toward the opposite side of the wall. In general, a mirror is utilized for this effect. By installing the mirror to the wall, the image of the room space can be seen in the mirror, and the people standing in front of the mirror do not recognize the wall to partition the room space and feel as if the extended space is spread toward the opposite side of the wall instead.

However, if the mirror installed to the wall, the people standing in front of the mirror actually can recognize the mirror by watching themselves. In addition, the mirror can just reflect the image of the room space, so the mirror cannot provide the illumination effect which gives people an aesthetic sensation. Sometimes, the mirror may make the people anxious and cause an uncomfortable feeling.

The value of the illumination system is large, when the visual effect can provide people standing in front of the wall with the feeling that the extended space is spread opposite side of the wall, instead of recognizing the mirror reflecting the image of the room space.

It is an object of the present invention to provide an illumination system which visual effect can provide people standing in front of the wall with the feeling that the extended space is spread toward the opposite side of the wall, instead of recognizing the mirror reflecting the image of the room space, and provide the illumination effect for arousing a beautiful feeling by the illumination and obtaining the visually decorated emotional effect at the around of the object.

Means for Solving the Problems

In order to solve the problem shown above, the present invention comprises the following configuration. The components described below can be employed in an arbitrary combination as desired. The technical feature and embodiment of the present invention is not limited to the description below. It should be understood that various changes are possible based on the whole specification and drawings or the recognition of the ordinary skilled person in the technical field of the invention.

In order to achieve the above-mentioned object, the present invention of an illumination system comprises; a light source; a reflection board for providing a reflection plane for reflecting light emitted by the light source; wherein the reflection plane of the reflection board is a processed reflection plane inscribed with numerous fine straight grooves arranged approximately in parallel or arranged in a curve approximately parallel to each other, providing an illumination effect with reflected light from the numerous fine grooves arranged approximately in parallel or arranged in a curve approximately parallel to each other generated by emitting light from the light source to the processed reflection plane of the reflection board.

According to the above-mentioned configuration of the illumination system, an extremely large number of positional light sources is generated on the processed reflection plane because there is a lot of fine straight grooves arranged approximately in parallel or arranged in a curve approximately parallel to each other are inscribed to the processed reflection plane, with each edge of the grooves and ribs becoming an extremely small positional light source. In addition, the reflected light on the processed reflection plane shows a pattern in which light intensity becomes weakened geometrically corresponding to the emitted light angle, and there is not a high reflection ratio as a whole compared with that of mirror. Therefore, the reflected light pattern is generated by the superimposing of each extremely small positional light source, the processed reflection plane does not create glare of the object facing the processed reflection plane, and the reflection pattern along to the groove direction is hardly created. As a result, the reflection pattern on the processed reflection plane becomes a linear pattern crossing the groove direction, located in the center position facing to each light source. This linear pattern of the reflection pattern can be seen as the light track generated on the extended horizontal plane spread opposite side of the wall, so the people standing in front of the illumination system feels and recognize the extended horizontal plane to be spread toward the opposite side of the wall.

In the above mentioned configuration, a groove pattern on the processed reflection plane is formed by a lot of fine straight grooves arranged approximately in parallel. Another groove pattern on the processed reflection plane is formed by a lot of fine grooves arranged in curve approximately parallel to each other.

Either groove pattern on the processed reflection plane can provide the visual effect by the reflection pattern for the people standing in front of the illumination system the feeling and recognition of the light track being seen on the extended horizontal plane spread toward the opposite side of the wall.

Next, in the above mentioned configuration, the light source may be a plurality of positional light sources, or may be a single or a plurality of linear light source. The reflection pattern on the processed reflection plane becomes different depending on the number of the light source and the type of the light source (such as a positional light source and a linear light source), and the visual effect can be varied.

Next, there are a variety of patterns of the position where the light source is installed.

For example, the light source can be installed to roof or wall nearby the processed reflection plane of the reflection board.

In another configuration, the illumination system includes a light source support body for supporting the light source, and the light source is supported by the light source support body facing and being close to the processed reflection plane of the reflection board. For example, the light source support body is a structure including a shelf-shaped frame arranged in front of the reflection board apart from a certain gap, and the light source supporting position is located in a plane of the shelf-shaped frame facing the processed reflection plane of the reflection board.

Next, there are a variety of patterns of the angle of the light emitting axis of the light source.

For example, the emitting axis of the light source is supported in the direction of a right angle crossing the processed reflection plane of the reflection board.

In other configuration, the emitting axis of the light source is supported in a predetermined angle crossing the processed reflection plane of the reflection board.

The reflection pattern on the processed reflection plane can be varied according to the emitting axis of the light source. The visual effect can be varied for the people standing in front of the illumination system to feel and recognize as if the extended horizontal plane is spread toward the opposite side of the wall comparatively greatly or comparatively smally according to the variation of the length and the angle of the light track extended on the horizontal plane spread toward the opposite side of the wall.

It is possible for the illumination system of the present invention to provide an illumination effect with a time variation by controlling the switching of the light source on and off or controlling the switching of the selected lighting light source.

In other configuration, a multicolor light source can be employed as the light source. The illumination system of the present invention can provide the illumination effect having a color variation by controlling the switching the selected color in the light source.

The illumination system of the present invention can applied to various objects.

For example, the illumination system of the present invention can be applied to a wall of a construction decoration object.

For example, the illumination system of the present invention can be applied to a roof of a construction decoration object.

For example, the illumination system of the present invention can be applied to a store decoration object.

For example, the illumination system of the present invention can be applied to a merchandize display object.

For example, the illumination system of the present invention can be applied to furniture.

For example, the illumination system of the present invention can be applied to a signboard.

Effect of the Invention

According to the present invention of the illumination system, there is a lot of fine straight grooves arranged approximately in parallel or arranged in a curve approximately parallel to each other inscribed on the processed reflection plane, so the reflection pattern on the processed reflection plane can be seen as the light track generated on the extended horizontal plane spread toward the opposite side of the wall, so the people standing in front of the illumination system feel and recognize the extended horizontal plane to spread toward the opposite side of the wall. The processed reflection plane does not create glare of the object facing the processed reflection plane, so the people standing in front of the illumination system feel and recognize the extended horizontal plane to spread toward the opposite side of the wall.

DETAILED DESCRIPTION OF THE PREFERRED EMBODIMENT

Some embodiments of an illumination system according to the present invention are described below with reference to the relevant drawings. Needless to add, the claims of the present invention include but are not limited to the application, configuration, or quantity shown in the following embodiments.

Embodiment 1

First of all, the principle of the particular visual effect obtained by the illumination system is described briefly.

The illumination system 100 includes the reflection board 120 and the light source 130.

The light source 130 is a device for emitting the light. The principle of light emission is not limited. For example, a LED, a light bulb, a display device such as EL panel and LCR panel can be applicable as long as the device can provide light. There is an electric supply apparatus to provide electricity to the light source 130 (not illustrated in drawings).

There are a lot of variations for the type and the number of the light source according to the configuration of the illumination system 100. For example, the light source may be a plurality of positional light sources, may be the single linear light source or may be a plurality of linear light sources.

Regarding the emitting axis of the light source 130, it may be at a right angle relative to the processed reflection plane of the reflection board 120 or may be a predetermined certain angle relative to the processed reflection plane of the reflection board 120.

The reflection board 120 is a component for providing the processed reflection plane for reflecting the emitted light from the light source 130.

The feature of the reflection board 120 is that the processed reflection plane is inscribed a lot of fine grooves arranged approximately straight in parallel or arranged in a curve approximately parallel to each other. For example, a lot of fine grooves are inscribed in the smoothly finished metal surface in the same direction using a turning process with lathe. The processing material bundling a lot of fine wires may be used for inscribing fine grooves. Such processing may be called hair-line processing. The hair-line processing is a processing for scratching a lot of fine grooves on a metal surface in the same direction.

The illumination system 100 provides an illumination effect by emitting light from the light source to the processed reflection plane of the reflection board and reflecting the emitted light with a lot of fine grooves arranged approximately straight in parallel or arranged in a curve approximately parallel to each other.

The principle of the particular visual effect obtained by the illumination system is described briefly.

FIG. 1 is an enlarged schematic view showing a part of the processed reflection plane. As shown in FIG. 1, there are a fine groove 122 and a rib 121 between grooves 122.

The actual processed reflection plane has a lot of fine grooves 122 arranged approximately straight in parallel or arranged in a curve approximately parallel to each other. The illustrated processed reflection plane shown in FIG. 1 has grooves 122 arranged in approximately the horizontal direction.

If the grooves 122 are not arranged in the same direction precisely in micro view, it is enough for the grooves 122 to be arranged in approximately the same direction.

If the reflection plane is just a mirror, the reflection plane has a high reflection ratio because the mirror has very smooth finished plane everywhere even in micro view. Therefore, the reflection angle is geometrically decided corresponding to the incidence angle, so the reflection light is uniquely obtained from the emitted light one by one. As a result, the reflection image is clearly seen as the mirror image.

In contrast, if the reflection plane is the processed reflection plane having a lot of fine grooves 122 arranged approximately straight in parallel or arranged in a curve approximately parallel to each other as shown in FIG. 1 there is a low reflection ratio, lower than that of mirror, and the emitted light may reflect and diffuse on ribs 121 and grooves 122. The ribs 121 and the grooves 122 are arrayed approximately in parallel in macro, so the reflecting portion acts like the positional light source and light spots appear.

The light spots of the positional light source are not spread uniformly but are located in the center line crossing the ribs 121 and grooves 122 because the ribs 121 and the grooves 122 are inscribed in horizontal in macro view. Horizontally, the ribs 121 may reflect the incident light symmetry direction, and the grooves 122 may absorb the incident light, so a light spot appears at the center line where the light source faces and no other light spots appear horizontally.

FIG. 2 is a macro schematic view showing a behavior of the light reflecting on the horizontal axis. As shown in FIG. 2, the ribs 121 may reflect the incident light symmetry direction, the grooves 122 may absorb the incident light, so the attenuation is large in horizontal axis, so one light spot appears at the center and other light spots does not appear on horizontal axis.

The emitted light from the light source 130 to the reflection board 120 spreads in various directions, not only the horizontal direction but also the vertical direction. FIG. 3 is a macro schematic view showing a behavior of the light reflecting on the vertical axis in the center part of the reflection board facing to the light source 130. As shown in FIG. 3 (*a*), light is emitted from the light source 130, then as shown in FIG. 3 (*b*), light is reflected on the vertical axis. By this reflected light, a light spot appears in the center part. Therefore, as shown in FIG. 3 (*c*), light spots appear along the vertical axis. However, the distance from the reflection plane of the position where the virtual image of each light spot forms depends on the vertical distance, so the people standing in front of the illumination system feel and recognize there to be an extended horizontal plane spread toward the opposite side of the wall, and the light track is recognized as the light track of the head light beam projecting on the extended horizontal plane.

Each of FIG. 4 to FIG. 6 is a schematic view showing the above described phenomenon in detail.

FIG. 4 is a schematic view showing the light behavior when the reflection plane of the reflection board 120 is a mirror and how the virtual image is seen.

As shown in FIG. 4, a LED as a light source 130 is present facing and close to the mirror, and the watcher sees from behind the light source 130. In FIG. 4, four light tracks are drawn as samples of the light emitted from the LED as the light source 130.

The emission light (1) is light emitted toward the upper direction. The reflection light (1) reflecting on the mirror turns upward corresponding to the incidence angle. The watcher does not see the reflection light (1).

The emission light (2) is light emitted toward the upper direction but lower than the emission light (1). The reflection light (2) reflecting on the mirror turns up corresponding to the incidence angle, and the reflection light (2) just goes to the watcher's eye. The watcher can watch the virtual image.

The position where the virtual image forms is the symmetry folded position of the emission light (2) on the mirror surface.

The emission light (3) is light emitted toward the lower direction. The reflection light (3) reflecting on the mirror turns downward corresponding to the incidence angle. The watcher does not see the reflection light (3).

The emission light (4) is light emitted toward the lower direction. The reflection light (4) reflecting on the mirror turns downward corresponding to the incidence angle. The watcher does not see the reflection light (4).

As shown above, when the reflection plane is a mirror, the watcher can see one virtual image clearly.

Next, FIG. 5 is a schematic view showing the light behavior when the reflection plane of the reflection board 120 is the processed reflection plane and how the virtual image is watched.

As shown in FIG. 5, a LED as a light source 130 is present facing and close to the processed reflection plane, and the watcher sees from behind the light source 130. In FIG. 5, the same as FIG. 4, four light tracks are drawn as samples of the light emitted from the LED as the light source 130.

The emission light (1) is light emitted toward the upper direction. A part of the reflection light (1) goes to the watcher's eye because the light spot appears on the processed reflection plane. The watcher can see the virtual image. It is recognized that the position where the virtual image forms is the symmetry folded position of the emission light (1) whose distance is the same as that of the emission light (1) traveling to the processed reflection plane.

The emission light (2) is light emitted toward the upper direction. A part of the reflection light (2) goes to the watcher's eye because the light spot appears on the processed reflection plane. The watcher can see the virtual image. It is recognized that the position where the virtual image forms is the symmetry folded position of the emission light (2) whose distance is the same as that of the emission light (2) traveling to the processed reflection plane.

Both of the emission light (3) and the emission light (4) are light emitted toward the lower direction. The same as the emission light (1) and the emission light (2), a part of the reflection light (3) and the reflection light (4) also go to the watcher's eye because the light spot appears on the processed reflection plane. The watcher can see the virtual image. It is recognized that the position where the virtual image forms is the symmetry folded position of the emission light (3) and the emission light (4) whose distances are the same as that of the emission light (3) and the emission light (4) traveling to the processed reflection plane respectively.

As shown in FIG. 5, when the reflection plane is the processed reflection plane, the watcher can see the virtual image of a LED as a light source 130 present facing and close to the processed reflection plane, when the watcher watches from behind the light source 130. In FIG. 5, the same as FIG. 4, four light tracks are drawn as samples of the light emitted from the LED as the light source 130.

As shown above, when the reflection plane is a mirror, the watcher can see the series of plural positional light in vertical on the processed reflection plane according to the distance and the angle.

FIG. 6 is a schematic view showing the series of the virtual images and the series of the light tracks formed by a series of the emission light emitted by a LED as the light source 130. As shown in FIG. 6, numerous virtual images are arrayed vertically. These are recognized as the lower the virtual image is formed, the larger the distance between the virtual image and the processed reflection plane. In result, the light track formed by overlapping of the numerous virtual images can be seen as if there is an extended horizontal plane spread toward the opposite side of the wall, and the light tracks are recognized as the light track of the head light beam projecting on the extended horizontal plane.

In the above description, the angle of the emitting axis of the light source 130 is a right angle relative to the processed reflection plane of the reflection board 120. The emitting axis of the light source 130 may be supported at a predetermined angle relative to the processed reflection plane of the reflection board 120. If the angle of the emitting axis of the light source 130 is varied, the strength and the position of the light tracks formed by merging the virtual images are varied.

In the above description, numerous fine grooves inscribed to the processed reflection plane of the reflection board 120 are arranged approximately straight in parallel. Numerous fine grooves may be arranged in a curve approximately parallel to each other. If numerous fine grooves are arranged in a curve approximately parallel to each other, the strength and the position of the light tracks formed by merging the virtual images are also varied.

As shown above, the strength and the position of the light tracks formed by merging the virtual images can be varied corresponding to the status of the inscription numerous fine groove, the position of the light source 130 supported by the light source support body 110, and the angle of the emission axis of the light source 130.

Various materials can be employed as the material of the reflection board 120. For example, metal such as stainless steel, aluminum and brass; glass; plastic board such as acrylic resin board; and wood can be employed. According to the difference of the material, the color and impression of the light tracks may vary, and a variety of visual effects may be obtained.

By the above described principle, the particular visual effect can be obtained by the illumination system 100. In addition to the visual effect, the illumination system 100 of the present invention can provide a decoration effect that works on the object put on the shelf-shaped frame. The illumination effect of the illumination system 100 of the present invention is not the direct illumination focusing on the shining the merchandize, but the indirect illumination around the merchandize whose visual effect provides the calm space including the merchandize for attracting people.

As shown above, the illumination system 100 comprises a light source 130 and a reflection board 120 providing the processed reflection plane in which numerous fine grooves are inscribed to the surface arranged approximately straight in parallel or arranged in a curve approximately parallel to each other, and the illumination system 100 can obtain the illumination effect provided by the reflection on numerous fine grooves arranged approximately straight in parallel or arranged in a curve approximately parallel to each other.

When the emission light from the light source 130 is projected on the reflection board 120, the reflection light pattern can be seen as the light track of the headlight beam projecting on the extended horizontal plane as if there is an extended horizontal plane spread toward the opposite side of the wall. There is no glare of the object facing to the processed reflection plane, so the visual effect is achieved whereby the watcher can recognize that there is an extended horizontal plane spread toward the opposite side of the wall.

The basic principle of the visual effect is the same even if the type and the number of the light source 130 vary. Therefore, there are many variations of the illumination system 100. The light source 130 may be a plurality of positional light sources, may be the single linear light source or may be a plurality of linear light sources. The angle of the emission axis of the light source 130 may be a right angle relative to the processed reflection plane of the reflection board 120 or may be a predetermined angle relative to the processed reflection plane of the reflection board 120.

The illumination effect may include time variation by controlling the switching of the light source on and off or the controlling the switching of the selection of the light among a plurality of the light sources 130. For example, the light selection may be switched one by one among the plurality of the light sources 130, and the visual effect is that the light track may move time by time.

The illumination effect may include color variation by switching the selected color in the light source 130 if multicolor light sources are employed. For example, if the light source 130 is a multicolor light source that can emit red, green and blue light, the visual effect can include the color variation by switching among the red emission, green emission and blue emission time by time.

Embodiment 2

As Embodiment 2, various embodiments employing the illumination system 100 of the present invention are described.

As shown in Embodiment 1, the illumination system 100 can provide the visual effect if it comprises the reflection board 120 and the light source 130 installed at the predetermined position.

The application of the illumination system 100 includes the reflection board 120 shown in Embodiment 1 and the light source 130 in the predetermined position relative to the reflection board 120.

In addition, the application of the illumination system 100 may include the light source support body 110 for supporting the light source 130. By utilizing the light source support body 110, the light source 130 can be supported in the position facing the processed reflection board 120 to obtain the visual effect shown in Embodiment 1. In addition, the light source 130 can be supported by the light source support body 110 on the roof or the wall nearby the reflection board 120.

First, the example of the merchandize display fixture 200a employing the illumination system 100 of the present invention is described.

FIG. 7 is a schematic view showing a merchandize display fixture 200a employing the illumination system 100 of the present invention. FIG. 7 (a) is the front view, FIG. 7 (b) is the right-side view.

As shown in FIG. 7, the merchandize display fixture 200a employing the illumination system 100 of the present invention comprises at least a light source support body 110, a reflection board 120, and a light source 130 (not shown in FIG. 7).

The figure of the light source support body 110 is not limited. For example, the light source support body 110 shown in FIG. 7 includes plural shelves which are often used in utensil furniture in front of the reflection board 120. These shelves have depth to some extent, the light sources 130 are installed on those shelves, bodies facing the reflection board 120 for projecting the emission light to the reflection board 120.

The light source support body 110 is installed in front of the reflection board 120 at a certain distance as shown in FIG. 7 (b). In other words, the light source 130 is supported in front of the reflection board 120 at a certain distance.

FIG. 8 is a schematic cross sectional view showing the inner structure of the merchandize display fixture 200 employing the illumination system 100 of the present invention. FIG. 8 (a) is the frontal cross sectional view, FIG. 8 (b) is the vertical cross sectional right side view.

As shown in FIG. 8 (a), a plurality of light sources 130 are embedded into the shelves of the light source support body 110, and these light sources 130 are arrayed for projecting the emission light to the reflection board 120. In this example, the shelves are installed approximately horizontally, LED of the light sources 130 are also installed approximately horizontally, and numerous fine grooves 122 inscribed in the processed reflection plane of the reflection board 120 are arranged approximately horizontally in parallel.

When the light sources 130 are turned on, the merchandize display fixture can obtain the visual effect as described in embodiment 1 by employing the illumination system of the present invention shown in embodiment 1.

As described in embodiment 1, the processed reflection plane of the reflection board 120 does not reflect the light as a virtual image like a mirror. It gives people standing in front of the illumination system a visual effect. The reflection pattern makes the watcher feel and recognize as if there is an extended horizontal plane spreading toward the opposite side of the wall, and the light track is recognized as the light track of the head light beam projecting on the extended horizontal plane.

FIG. 9 is a schematic view showing the visual effect obtained by the merchandize display fixture 200a employing the illumination system of the present invention.

FIG. 10 is a schematic view showing the light tracks 140 of the reflection pattern seen in the trial piece of the actual processed reflection plane of the reflection board 120 (part 1).

FIG. 11 is a schematic view showing the light tracks 140 of the reflection pattern seen in the trial piece of the actual processed reflection plane of the reflection board 120 (part 2).

FIG. 12 is a schematic view showing the image if the reflection plane is a mirror for comparing with the visual effect between the mirror and the processed reflection plane.

FIG. 9 shows a part of the light source support body 110 simply. The light sources 130 are hidden in the back side of the light source support body 110 for facing the reflection board 120. FIG. 9 also shows a part of the processed reflection plane of the reflection board 120 simply. The fine grooves inscribed in the processed reflection plane are not shown in FIG. 9 to understand the reflection pattern easily. FIG. 9 shows additional lines drawn by dotted line to assist the description.

As shown in FIG. 9, the emission light emitted by the light source 130 hits the processed reflection plane of the reflection board 120 and forms the light tracks 140 as the reflection pattern. In this example, the watcher recognizes the reflection pattern as the light tracks 140 appear on the reflection board 120. The example shown in FIG. 9 is drawn very simply. The light tracks 140 as the reflection pattern are recognized by the watcher as if there is an extended horizontal plane spreading toward the opposite side of the wall, and the light tracks 140 are recognized as the light tracks of the headlight beam projecting on the extended horizontal plane.

The actual light tracks 140 as the reflection pattern appearing on the processed reflection pattern of the reflection board 120 are shown in FIG. 10 and FIG. 11. As shown in FIG. 10 and FIG. 11, the actual light tracks 140 as the reflection pattern appearing on the processed reflection pattern of the reflection board 120 are actually recognizable as if they were light tracks of a headlight beam projecting on the extended horizontal plane spreading toward the opposite side of the wall. When the watcher watches these light tracks 140, he will recognize as if there is an extended horizontal plane spreading toward the opposite side of the wall. In FIG. 11, several objects are put on the frame of the light source support body 110 to understand the visual effect easily. As shown in FIG. 11, the watcher recognizes as if there is an extended horizontal plane spreading toward the opposite side of the wall, but actually there is the reflection board 120 behind the light source support body 110 nearby. This visual effect is one of an optical illusion for recognizing the light tracks 140 as the light tracks of the headlight beam projecting on the virtually extended horizontal plane.

The light tracks 140 on the processed reflection plane of the reflection board 120 can be seen clearly with high luminance. However, the reflection images of the watcher, the light source support body 110, and the objects in background are not seen or are hard to recognize compared with the light tracks 140 because of the downgraded reflection ratio of the processed reflection plane inscribed with numerous fine grooves arranged approximately straight in parallel or arranged in a curve approximately parallel to each other.

In contrast, as shown in FIG. 12, if the reflection plane of the reflection board 120 is a mirror, the watcher will see the mirror image simply, such as the light source support body 110 and the light sources 130 embedded into the light source support body 110. The light sources 130 are seen as high illumination shining positional light sources. In addition, the objects in the background and the watcher himself are seen in the mirror image. Therefore, the watcher can recognize that there is a mirror on the reflection board 120.

However, as shown in FIG. 9, the merchandize display fixture 200a employing the illumination system 100 of the present invention provides the special visual effect as if there is an extended horizontal plane spreading toward the opposite side of the wall even if he may recognize somewhat that a glass-like boundary exists.

Another merchandize display fixture 200b is described as follows.

FIG. 13 is a schematic view showing another type of merchandize display fixture 200b employing the illumination system 100 of the present invention. The light source support bodies 110 are provided as the merchandize display tool and the reflection board 120 is provided as the background board of the merchandize display space. The visual effect allows the customer to feel as if there is an extended horizontal plane spreading toward the opposite side of the wall and allows the customer to feel a calm space around the merchandize.

As described in embodiment 1, the illumination system 100 of the present invention can provide the special visual effect when it comprises a light source support body 110, a reflection board which reflection plane is a processed reflection board, a light source 130, and the light source 130 is supported by the light source support body 110 to face the processed reflection plane reflection board 120. Therefore, the configuration of the illumination system can be employed in various types of objects and various types of fixtures.

For example, the illumination system 100 of the present invention can be applied to a building display object on wall and roof, an interior object, and furniture and a sales promotion board.

FIG. 14 is a schematic view showing an interior object 200c, in which the illumination system 100 of the present invention is applied to the under reflection board of the bar counter. The light source support body 110 is provided as a footrest. The light source 130 is embedded into the backside of the footrest. The reflection board 120 is provided as the under reflection board of the bar counter. As shown in FIG. 14, the visual effect provides the eye with the feeling that there is an extended horizontal plane spreading toward the opposite side of the under reflection board of the bar counter. A building display object and an interior employing the illumination system 100 of the present invention can be provided similarly.

For example, the illumination system 100 of the present invention can be applied to a building display object on wall 200d.

FIG. 15 is a schematic view showing a building display object on wall 200d employing the illumination system 100 of the present invention. In this example, the light sources 130 are installed on the wall nearby the roof and floor. The reflection board 120 is installed on the wall. The light sources 130 are supported to illuminate the processed reflection plane reflection board 120 from the top side and the bottom side. The visual effect described in embodiment 1 can be obtained similarly.

For example, the illumination system 100 of the present invention can be applied to a building display object on a roof 200e.

FIG. 16 is a schematic view showing a building display object on roof 200e employing the illumination system 100 of the present invention. In this example, the light sources 130 are installed on the wall nearby the roof. The reflection board 120 is installed on the roof. The light sources 130 are supported to illuminate the processed reflection plane of the reflection board 120 from the top side of wall. The visual effect described in embodiment 1 can be obtained similarly.

For example, the illumination system 100 of the present invention can be applied to a signboard 200f.

FIG. 17 is a schematic view showing a signboard 200f employing the illumination system 100 of the present invention. In this example, the light sources 130 are installed on the light source support body 100 nearby the signboard or on the wall nearby the signboard. The reflection board 120 is installed on the surface of the signboard. The light sources 130 are supported to illuminate the processed reflection plane of the reflection board 120. The visual effect described in embodiment 1 can be obtained similarly.

The illumination system 100 can be applied not only to the above mentioned example, but to various other types of objects, and the visual effect can be provided in these objects employing the illumination system of the present invention.

While some preferable embodiments of the illumination system according to the present invention are described above, it should be understood that various changes are possible, without deviating from the technical scope according to the present invention. Therefore, the technical scope according to the present invention is limited only by the attached claims.

INDUSTRIAL APPLICABILITY

An illumination system according to the present invention can be applied to a various types of illumination systems. For example, it can be applicable to a building decoration

BRIEF DESCRIPTION OF THE DRAWINGS

FIG. 1 is an enlarged schematic view showing a part of the processed reflection plane.

FIG. 7 is a schematic view showing a merchandize display fixture 200a employing the illumination system 100 of the present invention.

FIG. 10 is a schematic view showing the light tracks 140 of the reflection pattern seen in the trial piece of the actual processed reflection plane of the reflection board 120 (part 1).

EXPLANATION OF REFERENCE

Figure 2:
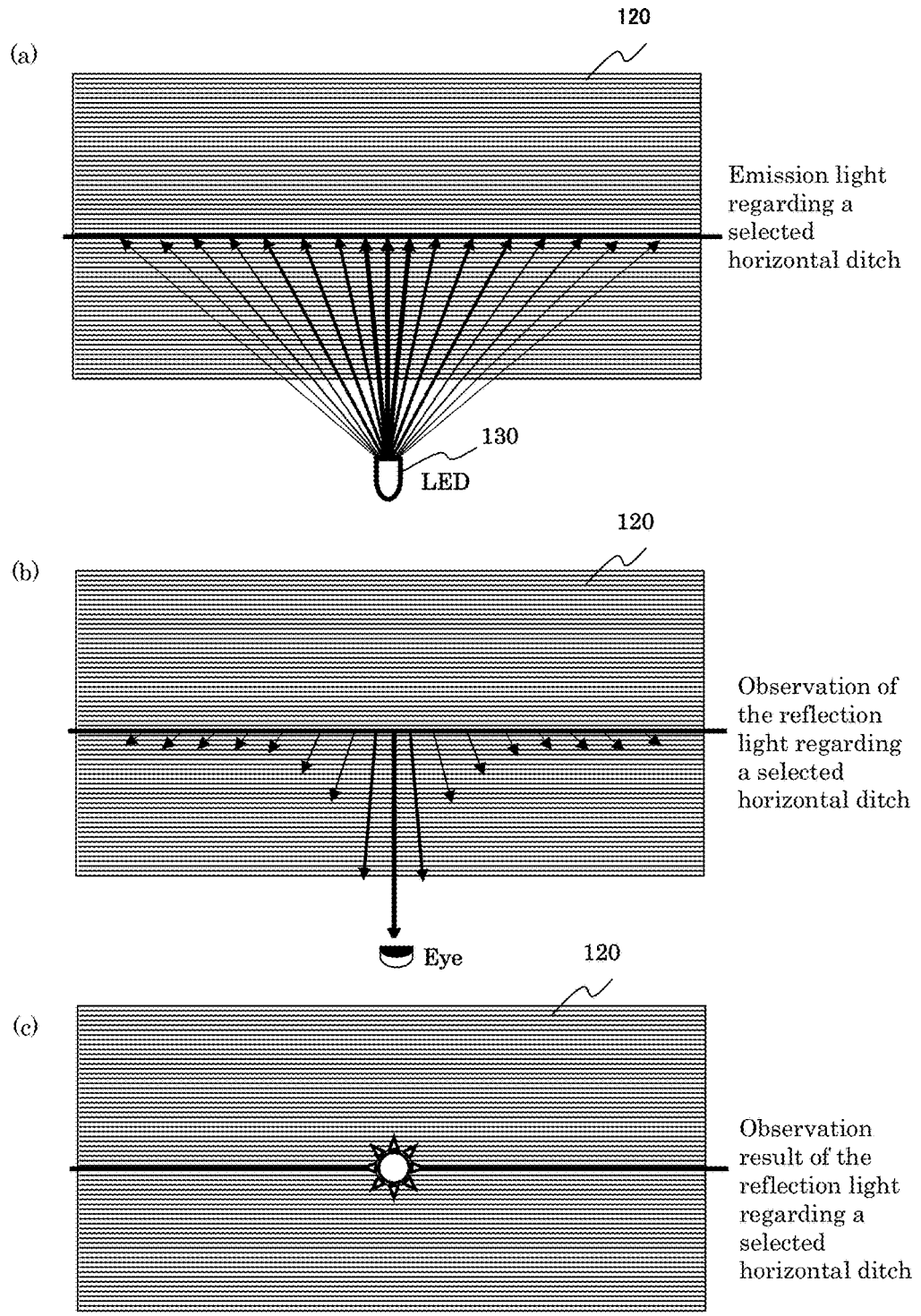
FIG. 2 is a macro schematic view showing a behavior of the light reflecting on the horizontal axis.
Figure 3:
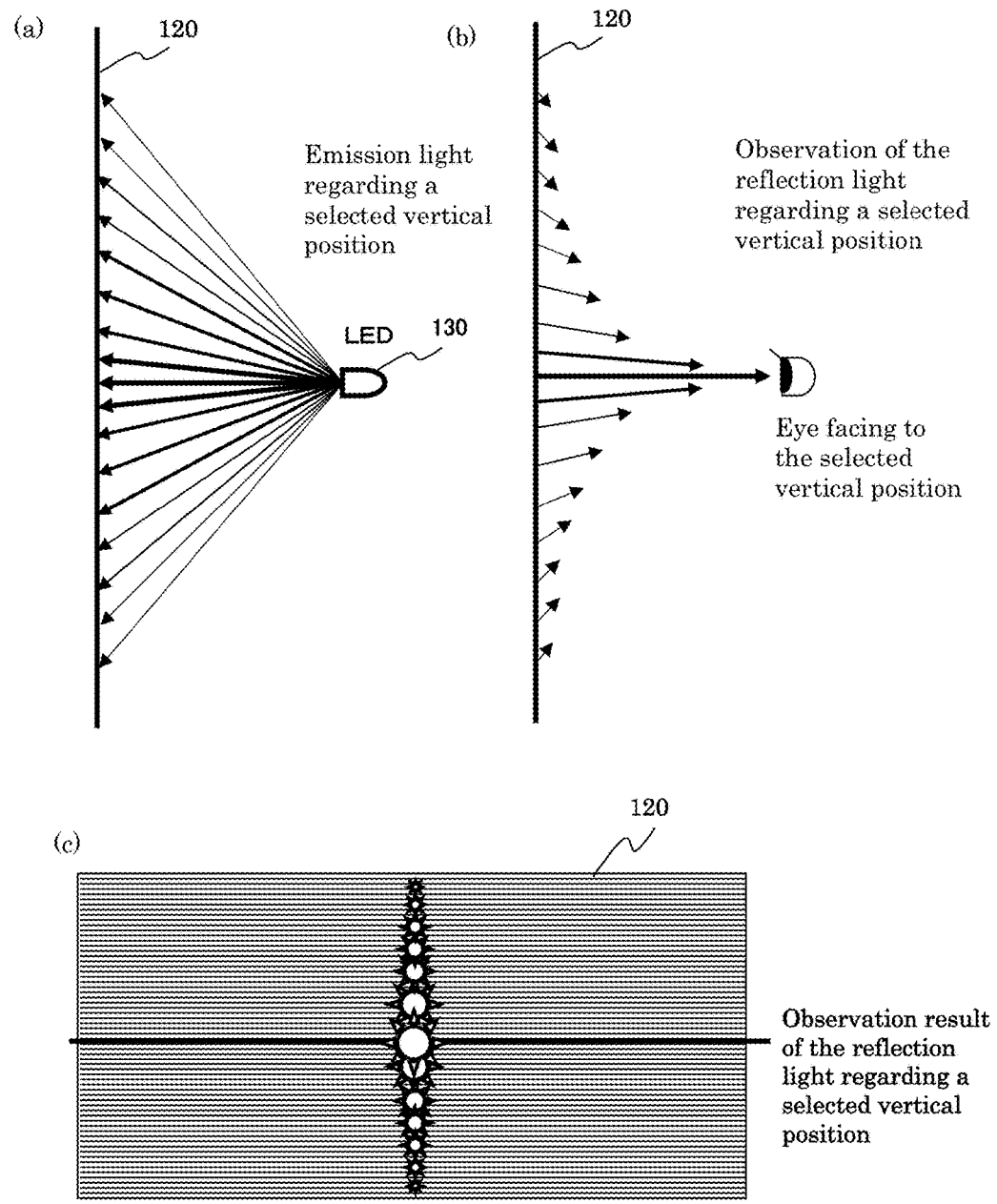
FIG. 3 is a macro schematic view showing a behavior of the light reflecting on the vertical axis in the center part of the reflection board facing to the light source 130.
Figure 4:
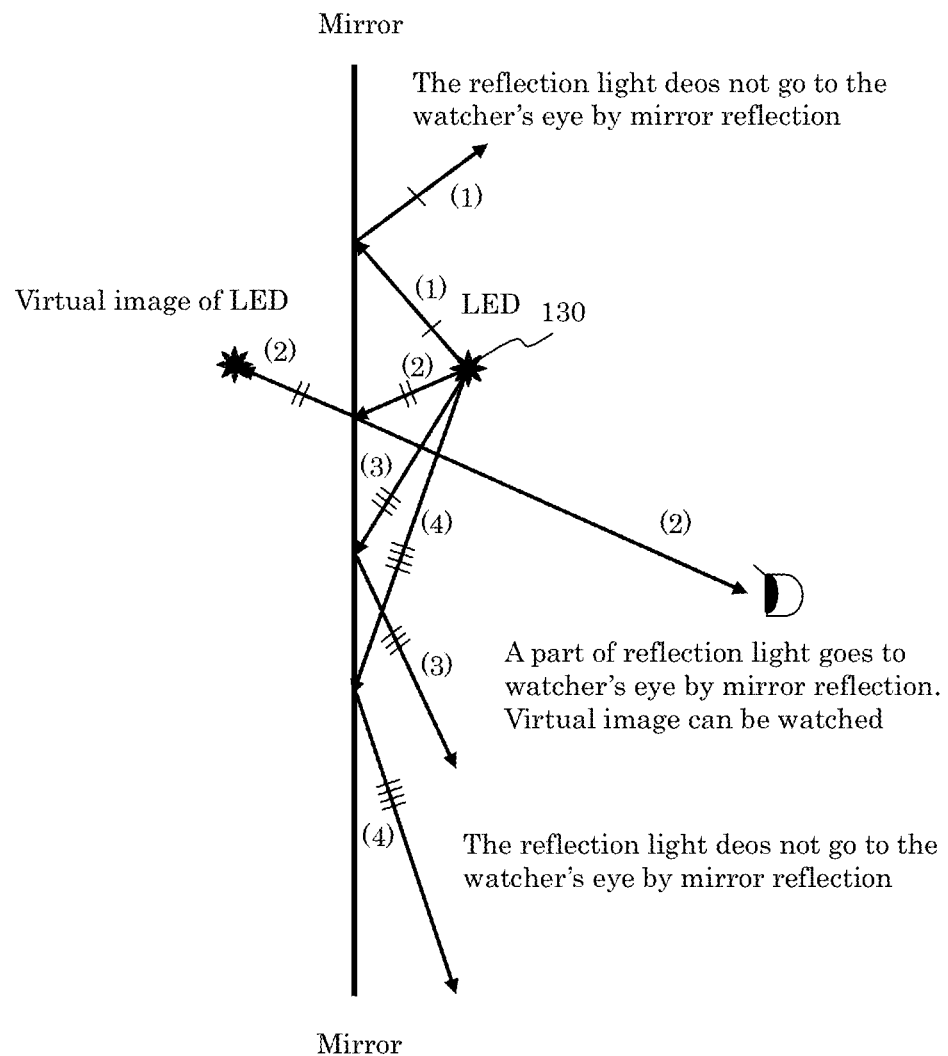
FIG. 4 is a schematic view showing the light behavior when the reflection plane of the reflection board 120 is a mirror, and how the virtual image is seen.
Figure 5:
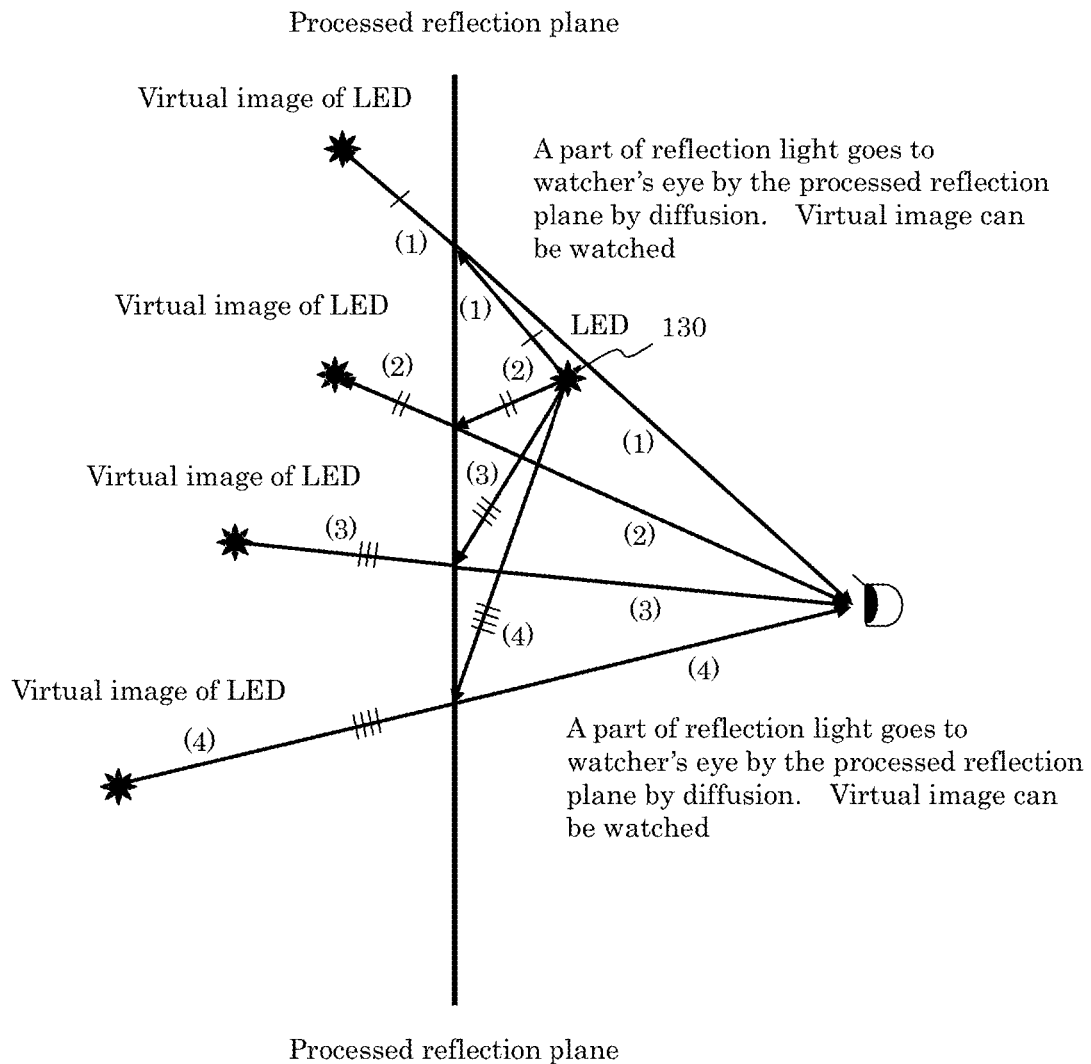
FIG. 5 is a schematic view showing the light behavior when the reflection plane of the reflection board 120 is the processed reflection plane, and how the virtual image is seen.
Figure 6:
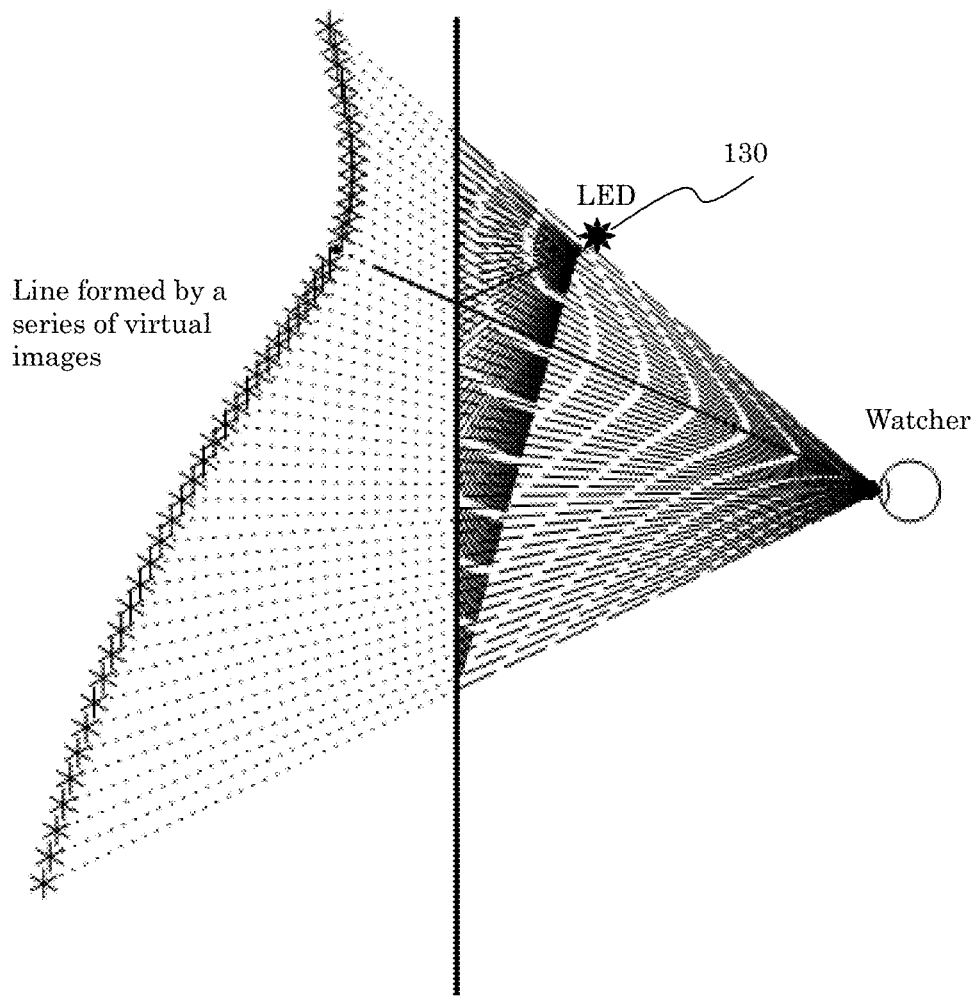
FIG. 6 is a schematic view showing the series of the virtual images and the series of the light tracks formed by a series of the emission light emitted by a LED as the light source 130.
Figure 8:
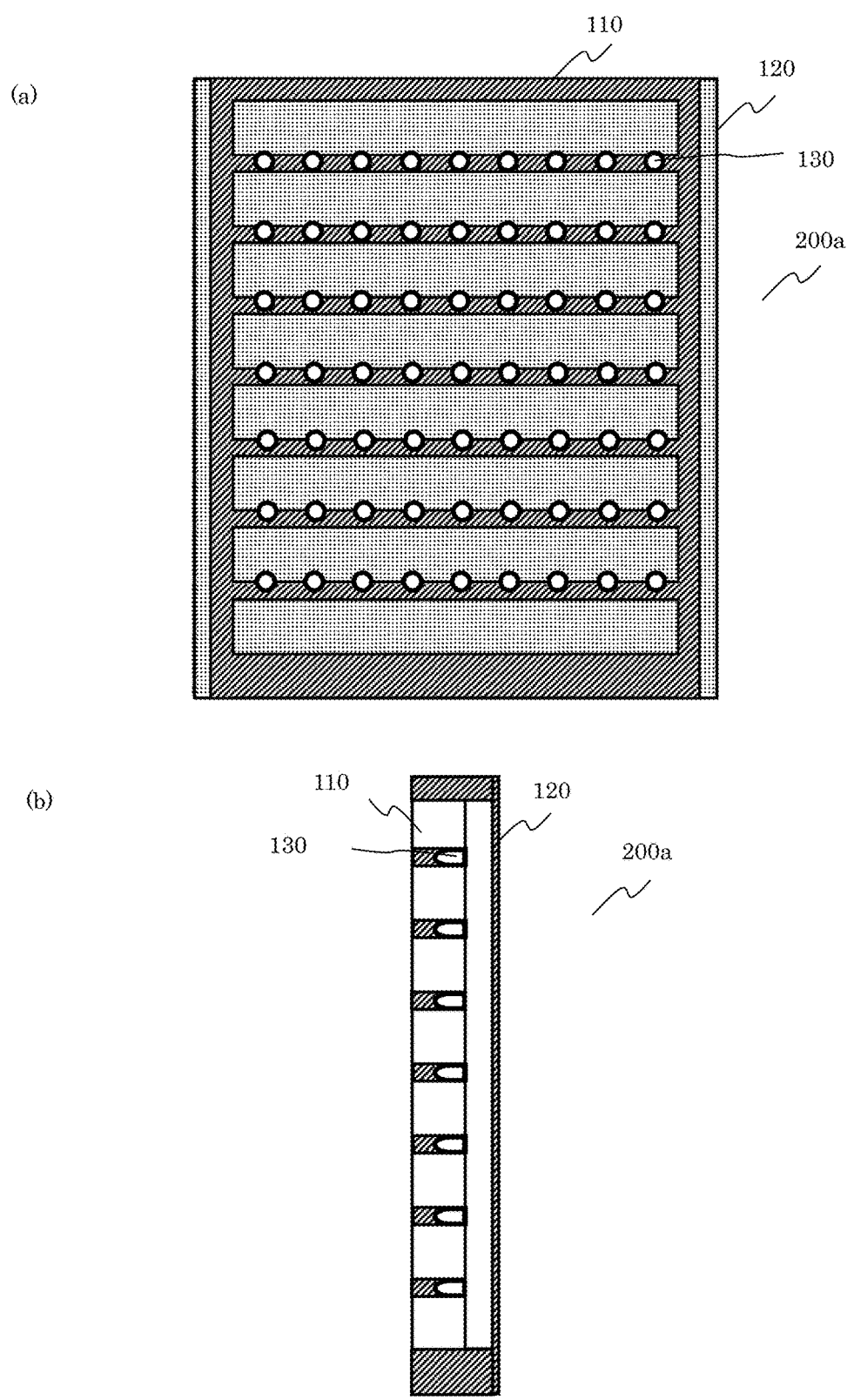
FIG. 8 is a schematic cross sectional view showing the inner structure of the merchandize display fixture 200 employing the illumination system 100 of the present invention.
Figure 9:
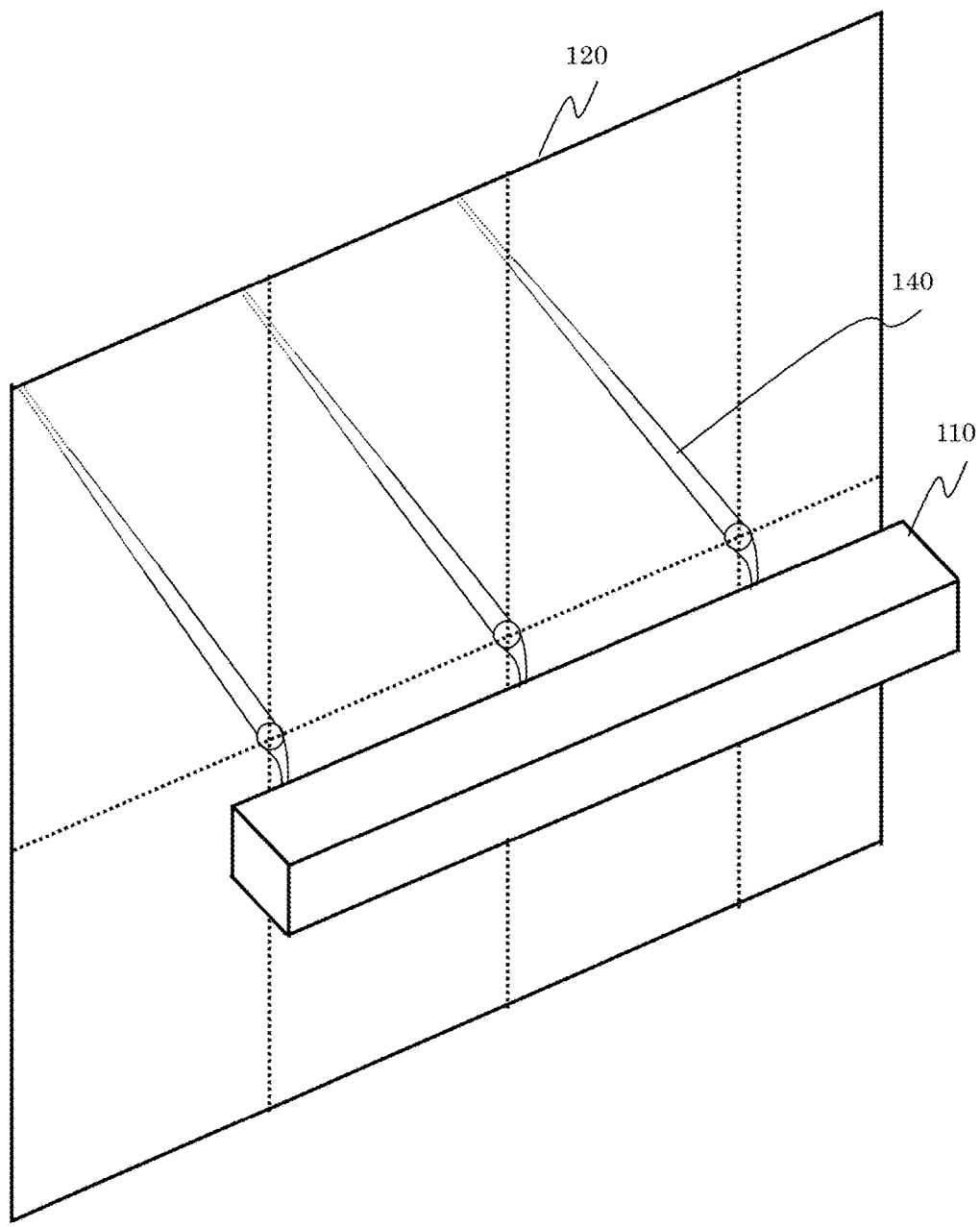
FIG. 9 is a schematic view showing the visual effect obtained by the merchandize display fixture 200a employing the illumination system of the present invention.
Figure 11:
FIG. 11 is a schematic view showing the light tracks 140 of the reflection pattern seen in the trial piece of the actual processed reflection plane of the reflection board 120 (part 2).
Figure 12:
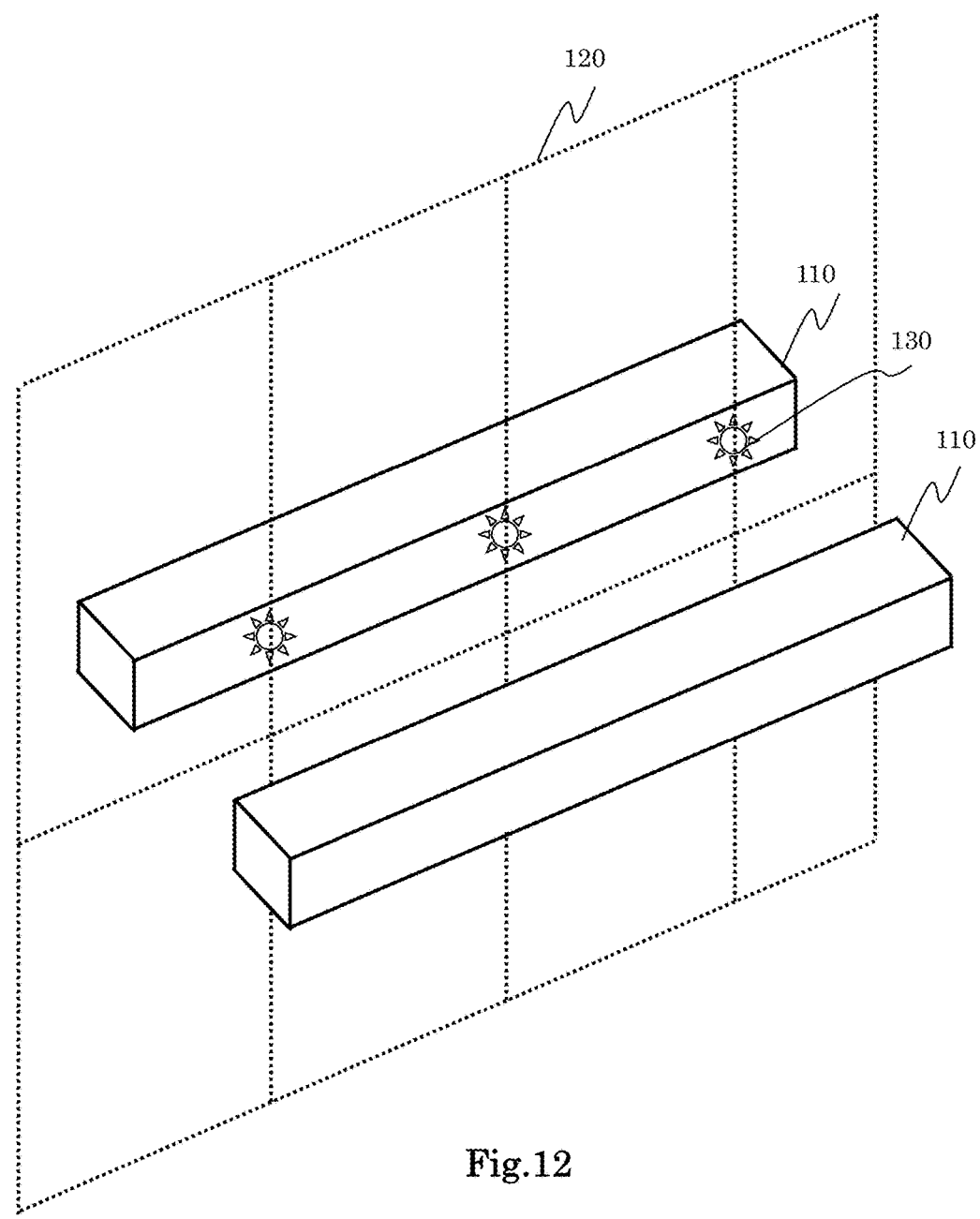
FIG. 12 is a schematic view showing the image if the reflection plane is a mirror for comparing with the visual effect between the mirror and the processed reflection plane.
Figure 13:
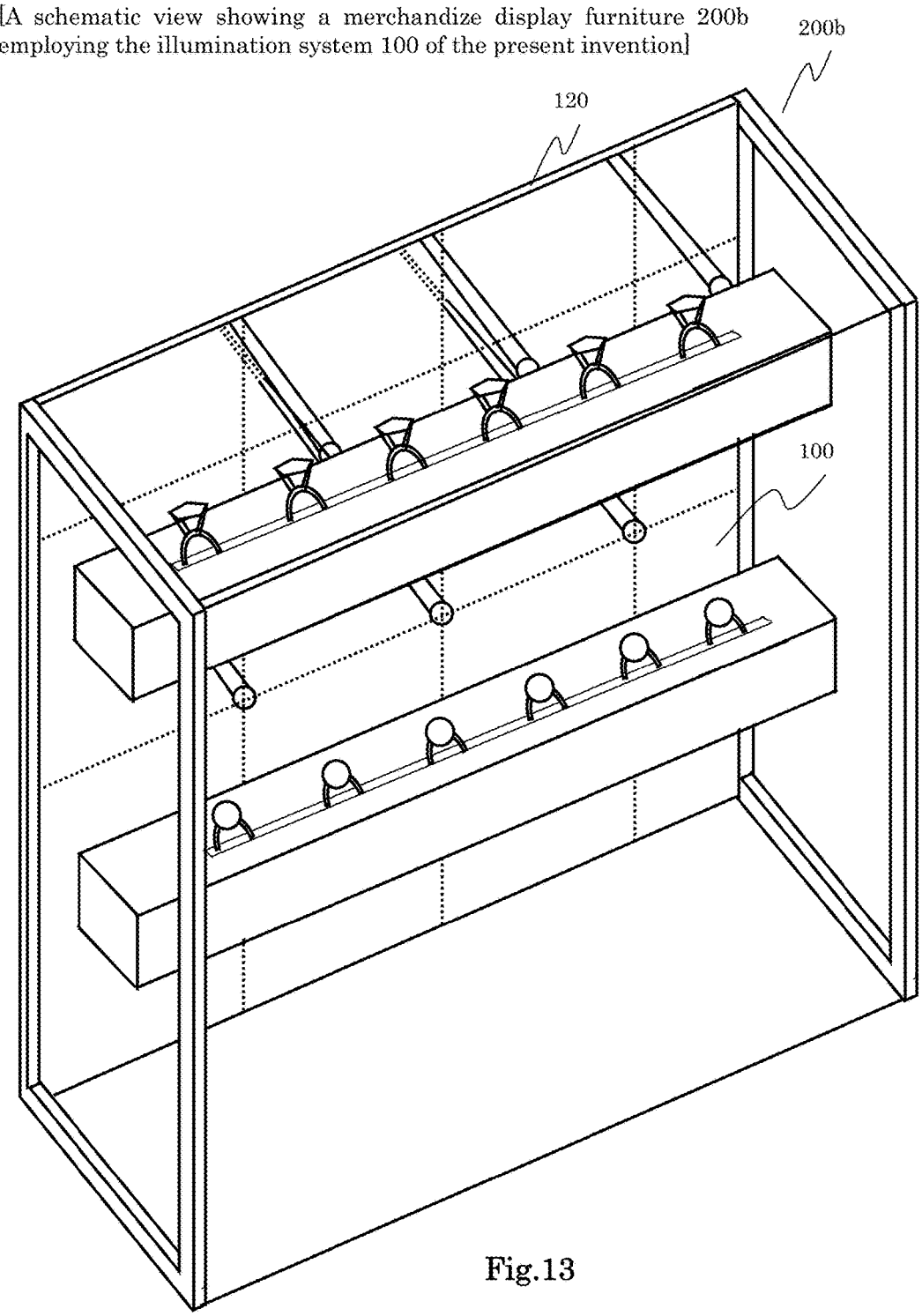
FIG. 13 is a schematic view showing other type of merchandize display furniture 200b employing the illumination system 100 of the present invention.
Figure 14:
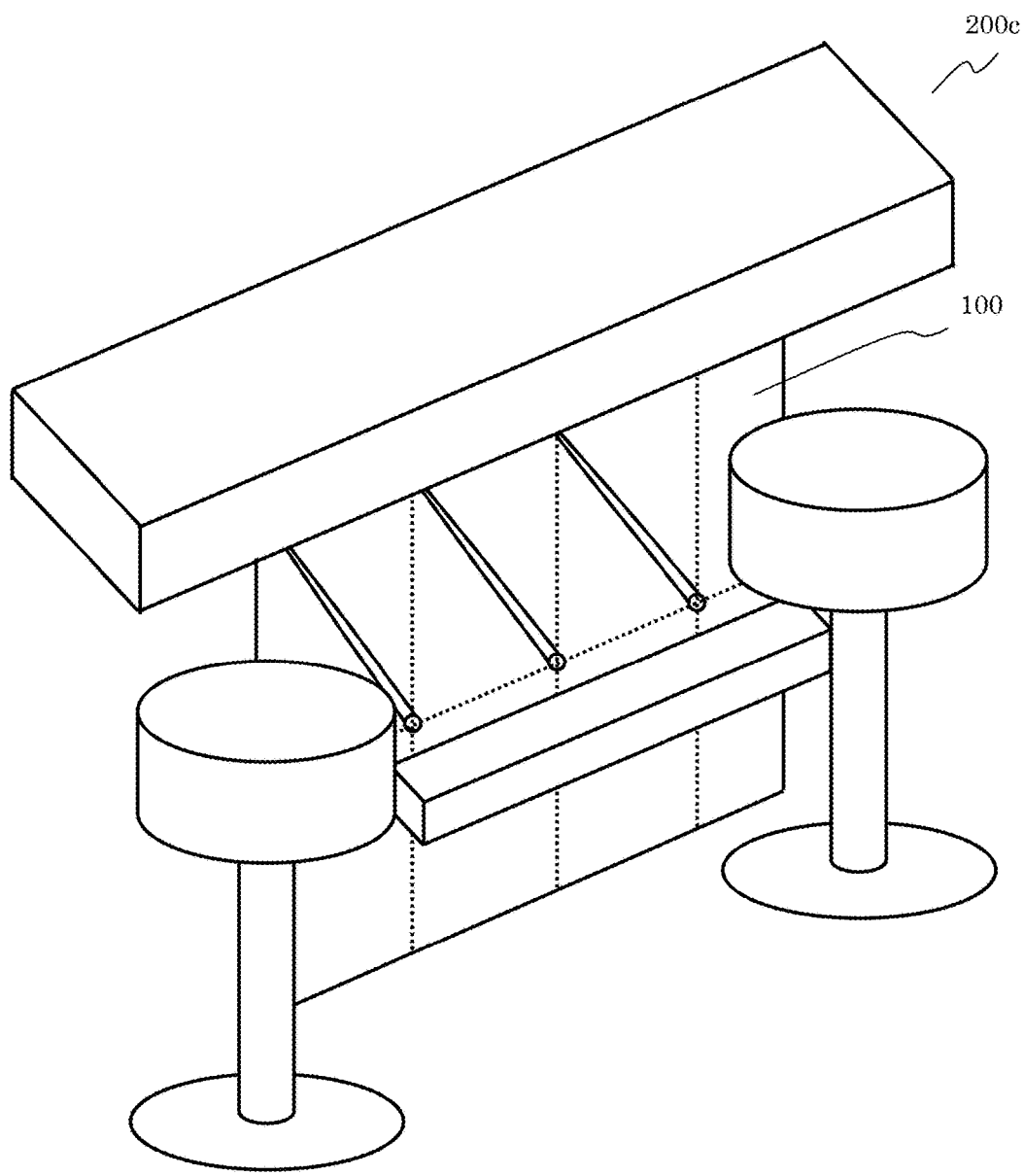
FIG. 14 is a schematic view showing an interior object 200c, which the illumination system 100 of the present invention is applied to the under reflection board of the bar counter.
Figure 15:
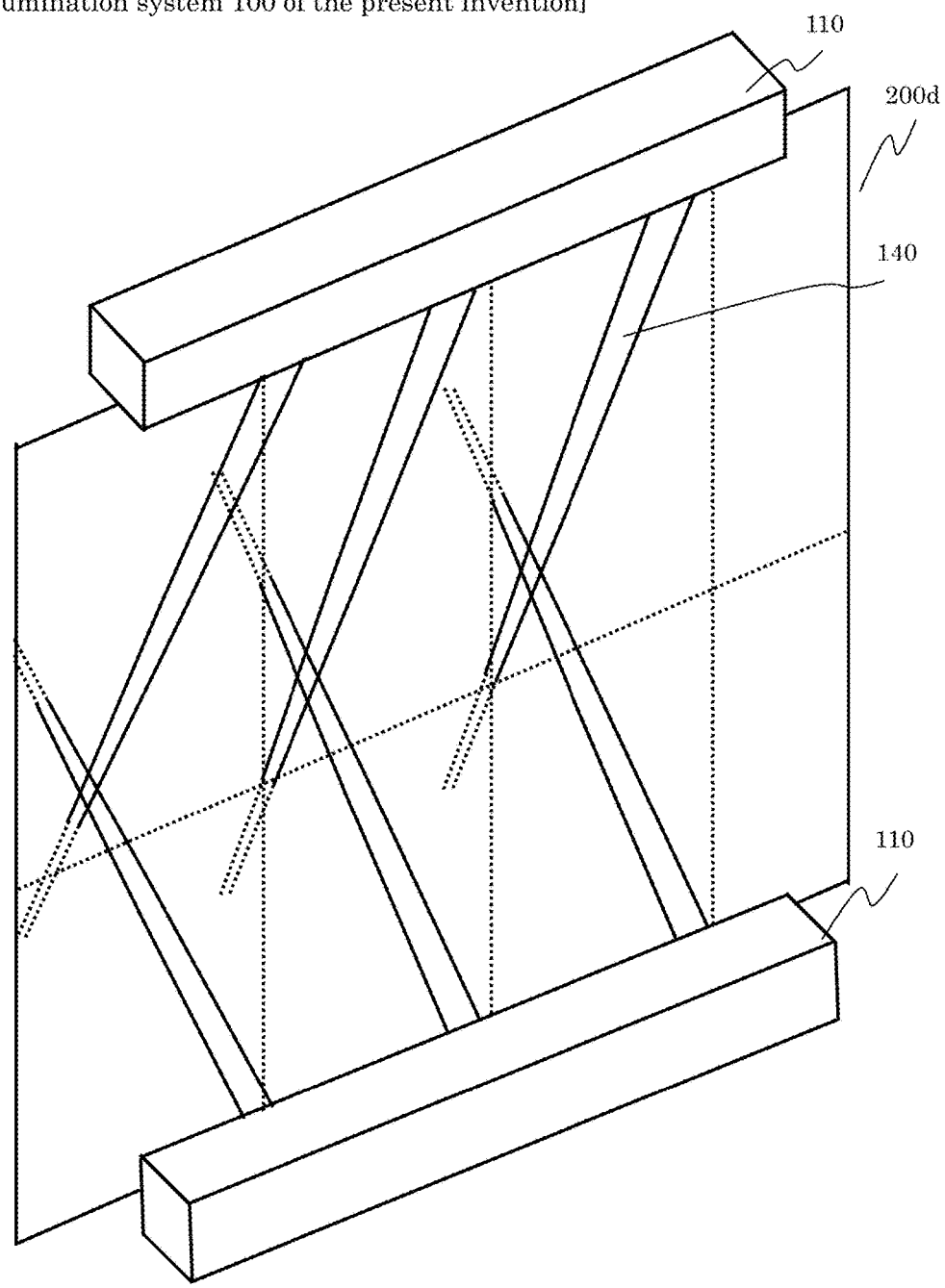
FIG. 15 is a schematic view showing a building display object on wall 200d employing the illumination system 100 of the present invention.
Figure 16:
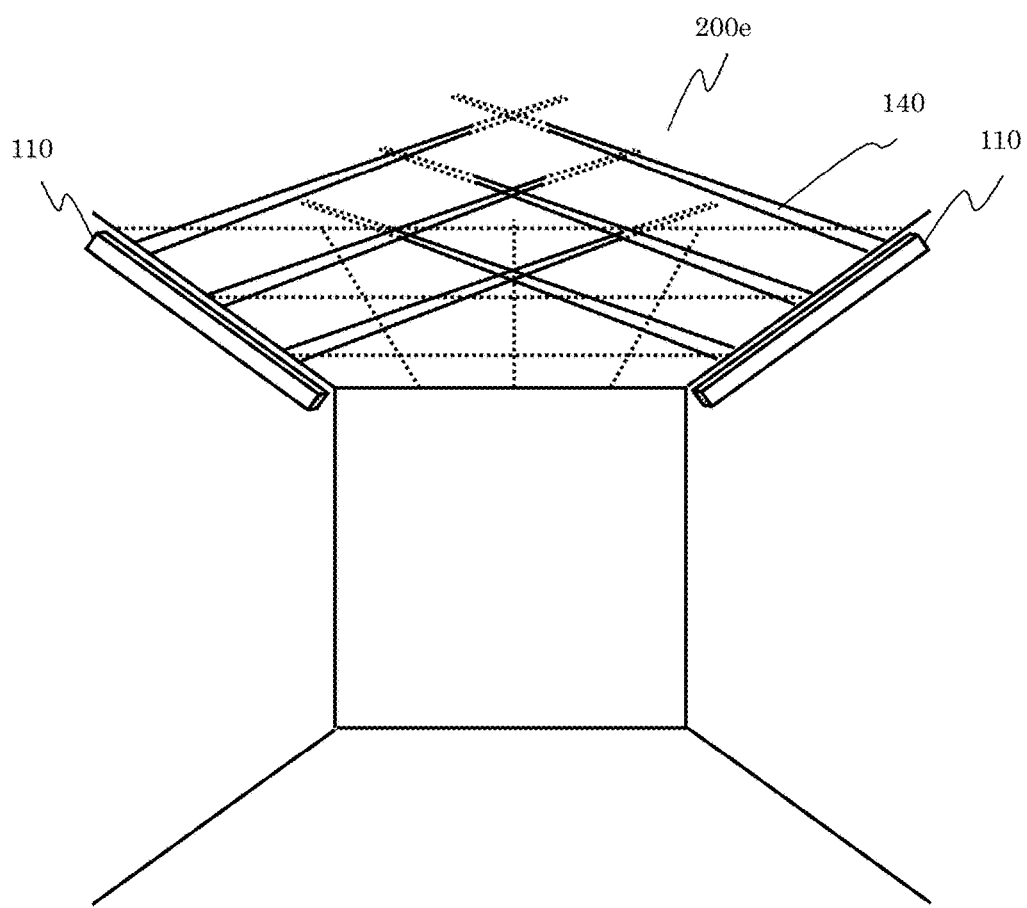
FIG. 16 is a schematic view showing a building display object on roof 200e employing the illumination system 100 of the present invention.
Figure 17:
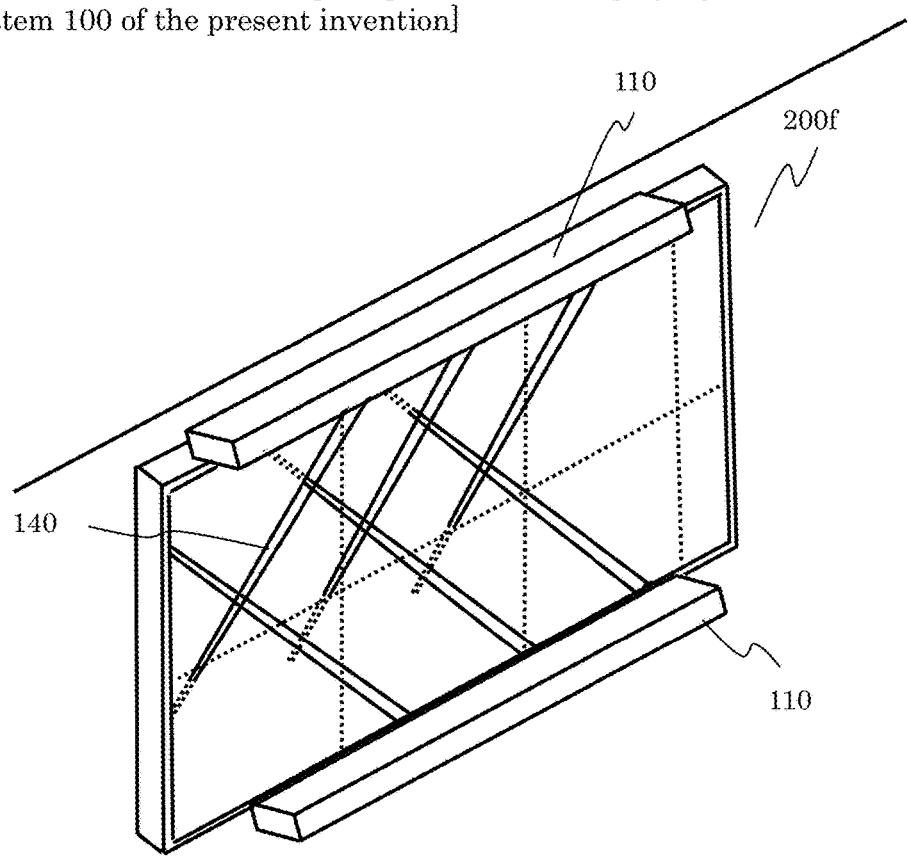
FIG. 17 is a schematic view showing a signboard 200f employing the illumination system 100 of the present invention.

100: Illumination system
110: Light source support body
120: Reflection board
121: Rib
122: Groove
130: Light source
140: Light track

The invention claimed is:

1. An illumination system comprising;
   a plurality of light sources;
   a reflection board comprising a reflection surface for reflecting light emitted by the light sources;
   wherein the reflection surface of the reflection board is inscribed with numerous fine grooves arranged approximately straight in parallel or arranged in a curve approximately parallel to each other,
   further comprising a light source support body for supporting the light sources so as to be positioned in a spaced relationship in front of and facing the reflection surface of the reflection board so a light emitting axis of the respective light sources is directed to the reflection surface of the reflection board,
   wherein the light source support body comprises a light source support structure spaced away from the reflection board, and positioned on the reflection surface side of the reflection board,
   wherein the light sources are arranged in a line or in a curved line on the facing side of the light source support body facing the reflection surface of the reflection board, which arrangement of the light sources corresponds to a longitudinal direction of the fine grooves, and
   wherein two of the light source support bodies are installed facing and close to the reflection surface of the reflection board, and the numerous fine grooves are inscribed between portions facing each light source support body respectively.

2. An illumination system according to claim 1, wherein the light sources are capable of being positioned.

3. The illumination system according to claim 2, wherein the light from the light sources appears as an image of plural tracks of light on the reflection plane of the reflection board extending in a direction transverse to the fine grooves.

4. An illumination system according to claim 1, wherein the reflection surface of the reflection board is installed to a roof or a wall, and the light source support body is installed to the roof or the wall nearby the reflection surface of the reflection board.

5. An illumination system according to claim 1, wherein the plurality of lights sources are positioned so the emitting axis of the respective light sources is supported at a right angle relative to the reflection surface of the reflection board.

6. An illumination system according to claim 1, wherein the plurality of lights sources are positioned so the emitting axis of the respective light sources is supported at a predetermined certain angle relative to the reflection surface of the reflection board.

7. An illumination system according to claim 1, wherein the illumination effect has a time variation by controlling the switching of the light sources on and off or the controlling the switching of a selected one or more of the light sources.

8. An illumination system according to claim 1, wherein multiple colors are emitted by the light sources, and the illumination effect has a color variation by controlling switching of the emitted color.

9. A construction decoration object employing the illumination system according to claim 1.

10. A wall employing the illumination system according to claim 1.

11. A roof employing the illumination system according to claim 1.

12. A store decoration object employing the illumination system according to claim 1.

13. A merchandize display object employing the illumination system according to claim 1.

14. A furniture employing the illumination system according to claim 1.

15. A signboard employing the illumination system according to claim 1.

16. The illumination system according to claim 1, wherein all of the fine grooves on the reflection surface of the reflection board are arranged approximately straight in parallel or arranged in a curve approximately parallel to each other.

* * * * *